United States Patent
Ohmura

(10) Patent No.: US 10,776,070 B2
(45) Date of Patent: Sep. 15, 2020

(54) INFORMATION PROCESSING DEVICE, CONTROL METHOD, AND PROGRAM

(71) Applicant: SONY CORPORATION, Tokyo (JP)

(72) Inventor: Junki Ohmura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 89 days.

(21) Appl. No.: 15/560,555

(22) PCT Filed: Mar. 25, 2016

(86) PCT No.: PCT/JP2016/059715
§ 371 (c)(1),
(2) Date: Sep. 22, 2017

(87) PCT Pub. No.: WO2016/158792
PCT Pub. Date: Oct. 6, 2016

(65) Prior Publication Data
US 2018/0107445 A1    Apr. 19, 2018

(30) Foreign Application Priority Data

Mar. 31, 2015   (JP) ................................. 2015-073895
Dec. 24, 2015   (WO) .................. PCT/JP2015/086098

(51) Int. Cl.
*G10L 25/48*   (2013.01)
*G06F 3/16*    (2006.01)
(Continued)

(52) U.S. Cl.
CPC ................ *G06F 3/16* (2013.01); *G06F 3/167* (2013.01); *G10L 13/00* (2013.01); *G10L 13/02* (2013.01);
(Continued)

(58) Field of Classification Search
CPC ....... G10L 15/22; G10L 15/30; G10L 15/193; G10L 13/00; G10L 13/027; G10L 13/047; G10L 15/20; G10L 15/24; G10L 17/26; G10L 19/0018; G10L 2015/223; G10L 2015/228; G06F 16/957; G06F 3/038; G06F 9/451; G06F 16/9577; G06F 3/013; G06F 8/20; G06F 16/10; G06F 16/2228; G06F 16/243; G06F 16/88; G06F 16/986; G06F 17/2735; G06F 17/276; G06F 17/2795;
(Continued)

(56) References Cited

U.S. PATENT DOCUMENTS 5,878,274 A *  3/1999  Kono ...................... G06F 3/038
                                                    340/500
7,912,187 B1 * 3/2011  Mikan ................... H04L 51/043
                                                    379/88.14
(Continued)

*Primary Examiner* — Abdelali Serrou
(74) *Attorney, Agent, or Firm* — Paratus Law Group, PLLC

(57) ABSTRACT

There is provided an information processing device, control method, and program that can improve convenience of a speech recognition system by deciding an appropriate response output method in accordance with a current surrounding environment. A response to a speech from a user is generated, a response output method is decided in accordance with a current surrounding environment, and control is performed such that the generated response is output by using the decided response output method.

10 Claims, 9 Drawing Sheets

(51) Int. Cl.
 *G10L 13/02* (2013.01)
 *G10L 13/00* (2006.01)
 *H04M 19/04* (2006.01)
 *G10L 15/20* (2006.01)

(52) U.S. Cl.
 CPC .............. *G10L 15/20* (2013.01); *G10L 25/48* (2013.01); *H04M 19/04* (2013.01)

(58) Field of Classification Search
 CPC ............. G06F 21/32; G06F 2203/0381; G06F 2209/543; G06F 3/01; G06F 3/011; G06F 3/017; G06F 3/0481; G06F 3/04883; G06F 3/16; G06F 3/167; G06F 8/00; G06F 8/38; G06F 8/456; G06F 9/542
 See application file for complete search history.

(56) References Cited

U.S. PATENT DOCUMENTS

| | | | | |
|---|---|---|---|---|
| 8,265,938 | B1* | 9/2012 | Verna | G08B 27/006 704/274 |
| 8,793,118 | B2* | 7/2014 | Srinivasa | G09B 21/009 704/2 |
| 9,037,455 | B1* | 5/2015 | Faaborg | G01C 21/3629 704/208 |
| 2001/0049275 | A1* | 12/2001 | Pierry | G06Q 10/04 455/414.1 |
| 2001/0049603 | A1* | 12/2001 | Sravanapudi | H04L 67/2823 704/270.1 |
| 2003/0097265 | A1* | 5/2003 | Sakai | G06F 3/16 704/260 |
| 2003/0167172 | A1* | 9/2003 | Johnson | G06F 16/957 704/270.1 |
| 2003/0169151 | A1* | 9/2003 | Ebling | H04M 19/04 340/7.58 |
| 2003/0182125 | A1* | 9/2003 | Phillips | H04L 12/66 704/270.1 |
| 2004/0166832 | A1* | 8/2004 | Portman | G06Q 30/02 455/412.1 |
| 2009/0234916 | A1* | 9/2009 | Cosentino | G16H 10/60 709/203 |
| 2010/0146583 | A1* | 6/2010 | Prehofer | G06Q 10/10 726/1 |
| 2010/0205667 | A1* | 8/2010 | Anderson | G06F 3/013 726/19 |
| 2011/0193788 | A1* | 8/2011 | King | G06F 3/017 345/173 |
| 2012/0003989 | A1* | 1/2012 | Gravino | H04W 4/21 455/456.1 |
| 2012/0271643 | A1* | 10/2012 | Da Palma | G10L 15/22 704/275 |
| 2013/0184981 | A1* | 7/2013 | Vogedes | G01C 21/3629 701/400 |
| 2013/0293363 | A1* | 11/2013 | Plymouth | G06Q 20/42 340/309.16 |
| 2013/0339345 | A1* | 12/2013 | Soto Matamala | G06F 16/9537 707/722 |
| 2014/0201673 | A1* | 7/2014 | Dunn | G06F 3/0481 715/781 |
| 2014/0240122 | A1* | 8/2014 | Roberts | H04W 4/00 340/539.11 |
| 2014/0306838 | A1* | 10/2014 | Beumler | B60N 2/28 340/988 |
| 2014/0310075 | A1* | 10/2014 | Ricci | H04W 4/21 705/13 |
| 2015/0287164 | A1* | 10/2015 | Kominar | G06T 1/00 345/647 |
| 2015/0309483 | A1* | 10/2015 | Lyman | G05B 15/02 700/275 |
| 2016/0132975 | A1* | 5/2016 | Liao | G06Q 50/06 705/7.31 |
| 2016/0148099 | A1* | 5/2016 | Micali | G06N 5/04 706/11 |
| 2017/0084175 | A1* | 3/2017 | Sedlik | G07C 5/008 |

* cited by examiner

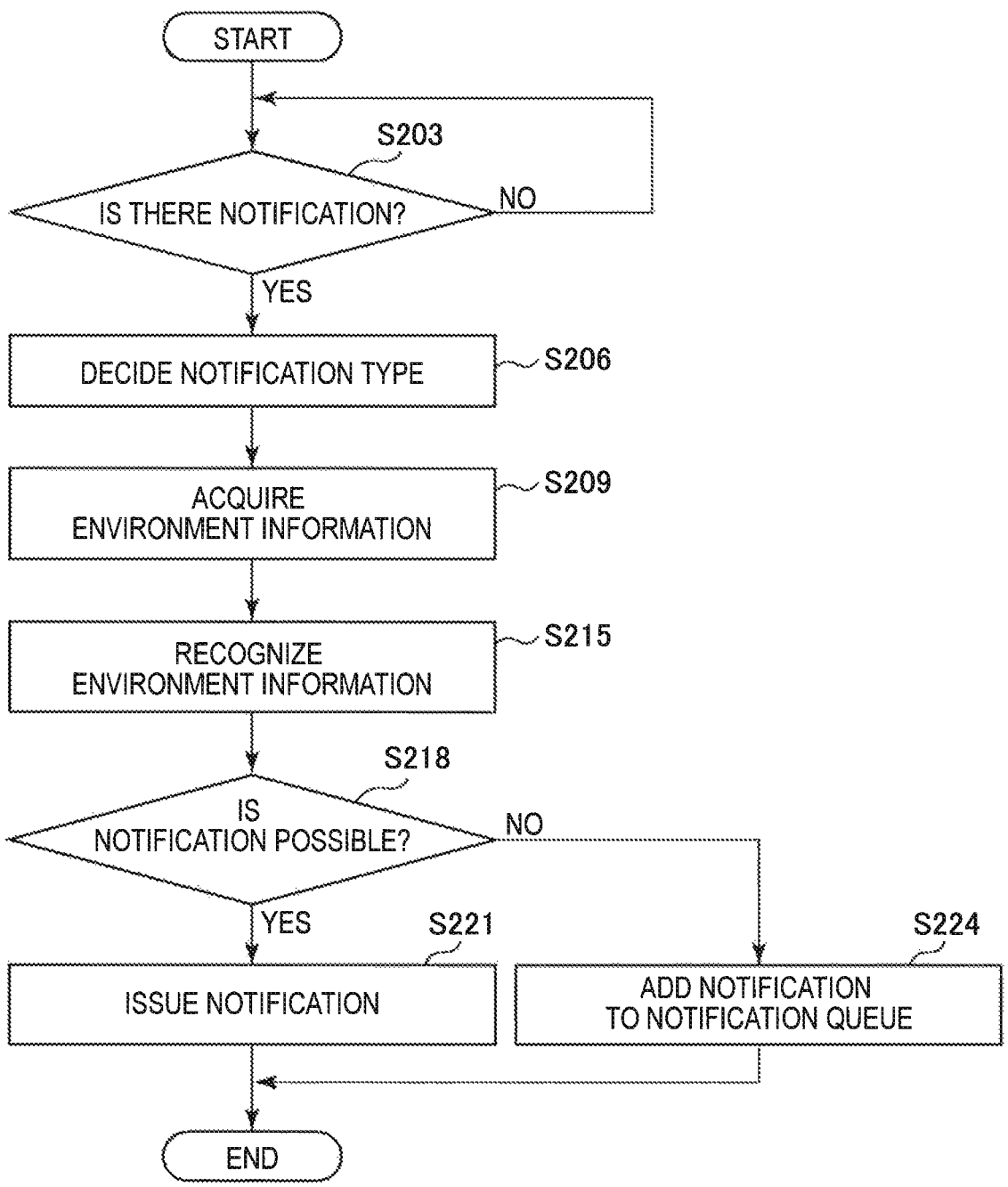

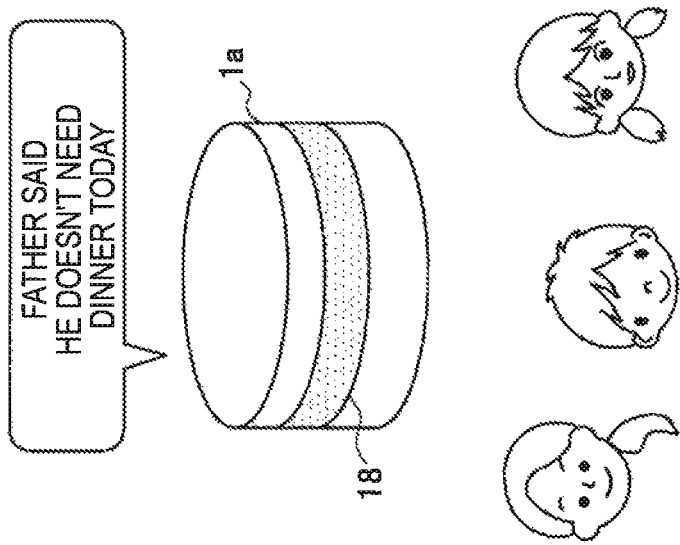
FIG. 9A
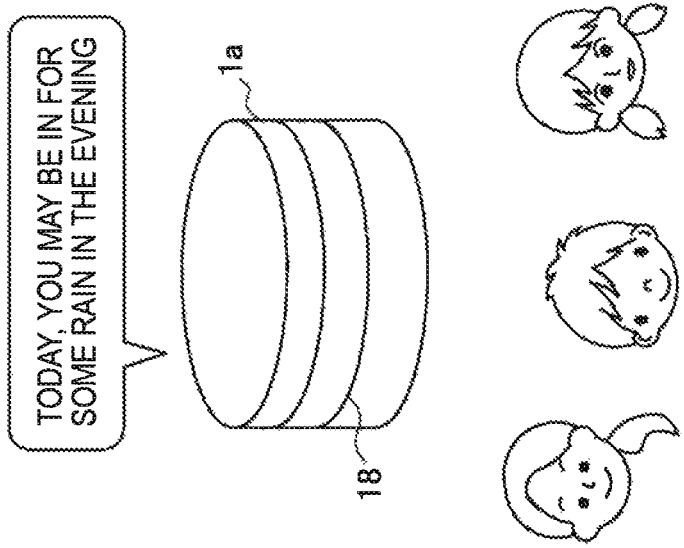

FIG. 9B
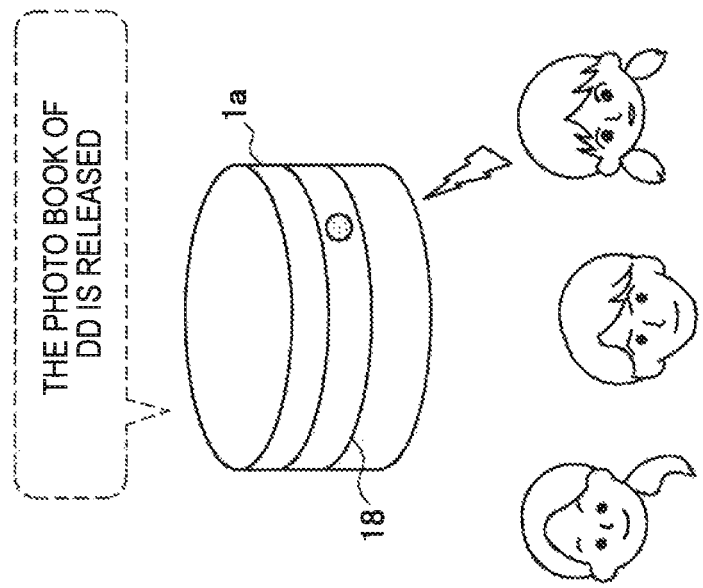
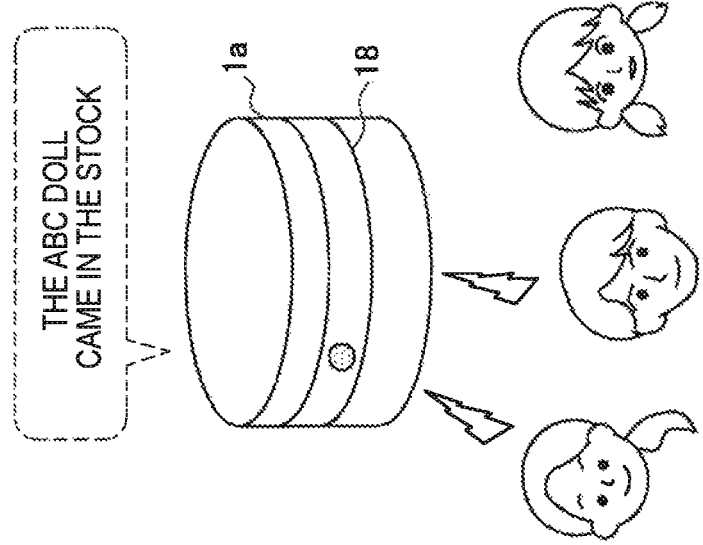

INFORMATION PROCESSING DEVICE, CONTROL METHOD, AND PROGRAM

CROSS REFERENCE TO PRIOR APPLICATION

This application is a National Stage Patent Application of PCT International Patent Application No. PCT/JP2016/059715 (filed on Mar. 25, 2016) under 35 U.S.C. § 371, which is a continuation-in-part of PCT International Patent Application No. PCT/JP2015/086098 (filed on Dec. 24, 2015), which claims priority to Japanese Patent Application No. 2015-073895 (filed on Mar. 31, 2015), which are all hereby incorporated by reference in their entirety.

TECHNICAL FIELD

The present disclosure relates to information processing devices, control methods, and programs.

BACKGROUND ART

Technologies of performing speech recognition and semantic analysis on speeches from users and responding by voice have been conventionally developed. Specifically, it is possible to perform speech recognition processes within a practical time due to recent development in speech recognition algorithms and computer technologies, and user interfaces (UIs) for smartphones or tablets that use voice have become popular.

For example, it is possible to respond, by voice, to a question made by voice of a user, or it is possible to execute a process corresponding to an instruction made by voice of a user, by using an application of a voice UI installed in a smartphone, a tablet terminal, or the like.

CITATION LIST

Patent Literature

Patent Literature 1: JP 2014-132396A

DISCLOSURE OF INVENTION

Technical Problem

However, usability of a voice UI becomes worse in an environment in which it's not preferable to speak or in an environment including large noise. For example, the patent literature 1 proposes a mobile terminal system in which pseudo conversation on the phone is established. In the system, a voice of a partner is converted to text when a mobile terminal set to a silent mode receives incoming call, the converted text is presented to a user, and when the user respond by text, the text is converted into a voice and transmitted to the partner. Accordingly, it is possible to improve usability of the mobile terminal that establishes conversation on the phone even in the environment in which it's not preferable to speak or in an environment including large noise.

However, according to the mobile terminal system, the pseudo conversation on the phone is established by using the voice-text conversion when the mobile terminal is set to the silent mode in advance, but the pseudo conversation on the phone is not automatically established in accordance with a situation or an environment of the user at that time.

Therefore, the present disclosure proposes an information processing device, control method, and program that can improve convenience of a speech recognition system by deciding an appropriate response output method in accordance with a current surrounding environment.

Solution to Problem

According to the present disclosure, there is provided an information processing device including: a response generation unit configured to generate a response to a speech from a user, a decision unit configured to decide a response output method in accordance with a current surrounding environment; and an output control unit configured to perform control such that the generated response is output by using the decided response output method.

According to the present disclosure, there is provided a control method including: generating a response to a speech from a user; deciding a response output method in accordance with a current surrounding environment; and performing control, by an output control unit, such that the generated response is output by using the decided response output method.

According to the present disclosure, there is provided a program causing a computer to function as: a response generation unit configured to generate a response to a speech from a user; a decision unit configured to decide a response output method in accordance with a current surrounding environment; and an output control unit configured to perform control such that the generated response is output by using the decided response output method.

Advantageous Effects of Invention

As described above, according to the present disclosure, it is possible to improve convenience of a speech recognition system by deciding an appropriate response output method in accordance with a current surrounding environment.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a flowchart illustrating a notification process according to another example of the embodiment.

FIG. 9A is a diagram illustrating a method of Public notification according to another example of the embodiment.

FIG. 9B is a diagram illustrating a method of Private notification according to another example of the embodiment.

MODE(S) FOR CARRYING OUT THE INVENTION

Figure 1:
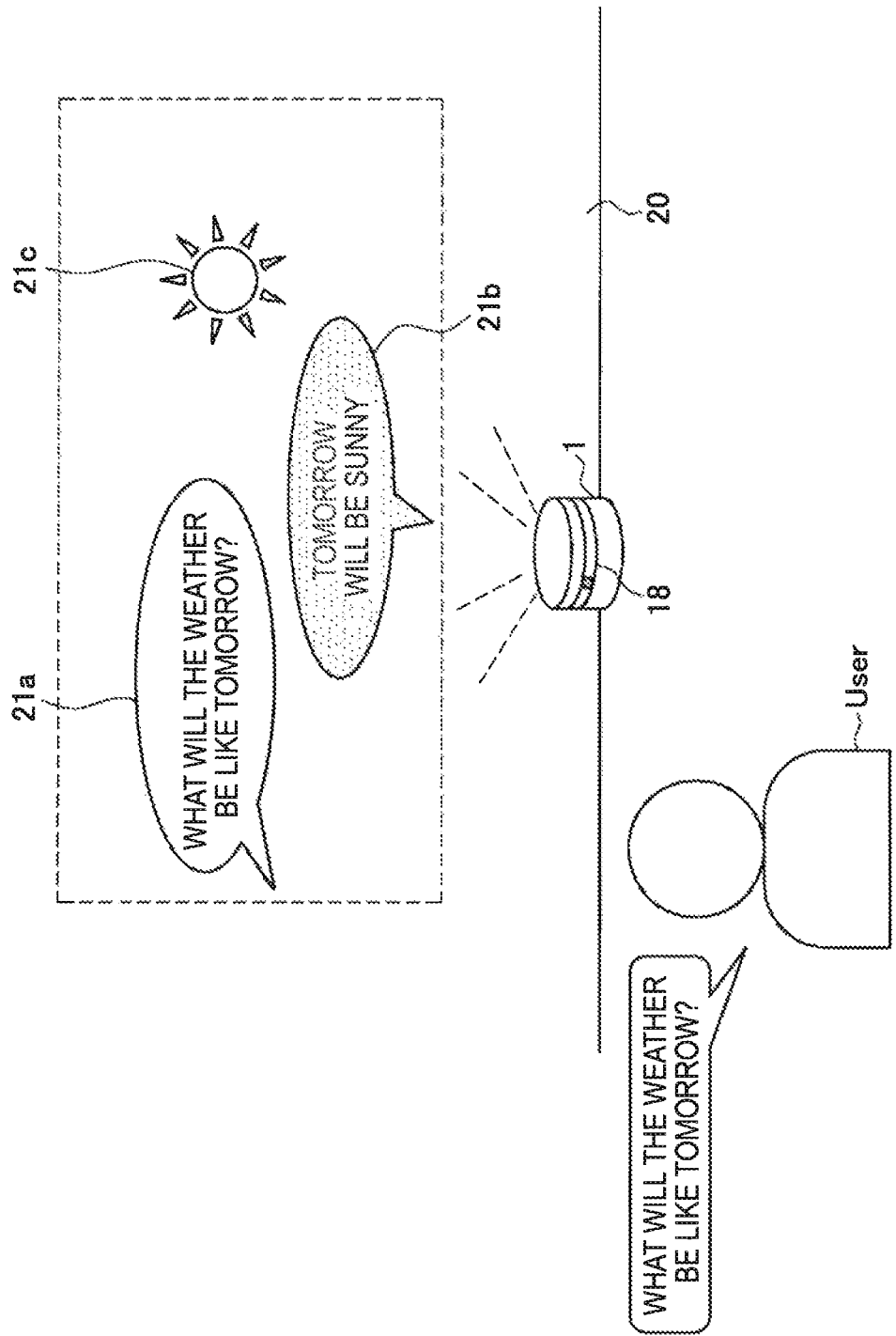
FIG. 1 is a diagram illustrating an overview of a speech recognition system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. Overview of speech recognition system according to embodiment of present disclosure
2. Configuration
3. Operation process
4. Response output example
4-1. Response output using voice
4-2. Response output using display
4-3. Response output in cooperation with equipment
4-4. Dynamic response output
4-5. Notification of allowable output level
5. Output in multiple user environment
6. Conclusion

1. Overview of Speech Recognition System According to Embodiment of Present Disclosure The speech recognition system according to an embodiment of the present disclosure includes a basic function of performing speech recognition and semantic analysis on speeches from users and responding by voice. First, with reference to FIG. 1, an overview of the speech recognition system according to the embodiment of the present disclosure will be described.

FIG. 1 is a diagram illustrating the overview of the speech recognition system according to the embodiment of the present disclosure. An information processing device 1 illustrated in FIG. 1 has a voice UI agent function capable of performing speech recognition and semantic analysis on a speech from a user and outputting a response to the user by voice. The appearance of the information processing device 1 is not specifically limited. For example, as illustrated in FIG. 1, the appearance of the information processing device 1 may be a circular cylindrical shape, and the device may be placed on a floor or on a table in a room. In addition, the information processing device 1 includes a band-like light emitting unit 18 constituted by light emitting elements such as light-emitting diodes (LEDs) such that the light emitting unit 18 surrounds a central region of a side surface of the information processing device 1 in a horizontal direction. By lighting a part or all of the light emitting unit 18, the information processing device 1 can notify a user of a state of the information processing device 1. For example, by lighting a part of the light emitting unit 18 in a user direction (that is, speaker direction) during conversation with the user, the information processing device 1 can operate as if the information processing device 1 looks on the user as illustrated in FIG. 1. In addition, by controlling the light emitting unit 18 such that the light rotates around the side surface during generating a response or searching for data, the information processing device 1 can notify the user that a process is ongoing.

Here, all of conventional voice UIs output responses by voice. However, sometimes the response output using voice is not preferable at night or in the case where a child is sleeping near a user. In addition, the response output using voice is not preferable in an environment with large noise.

Therefore, it is possible to improve convenience of the speech recognition system according to the embodiment of the present disclosure by deciding an appropriate response output method in accordance with a current state of a user.

Specifically, for example, the information processing device 1 has a function of projecting and displaying an image on a wall 20 as illustrated in FIG. 1. In the case of night or in the case where a baby is sleeping near a user, an output method is automatically switched to an output method that converts a response into a text and projects it on the wall 20. This can prevent response output using voice, and it is possible to appropriately respond in an environment in which response output using voice is not appropriate. In the example illustrated in FIG. 1, the information processing device 1 projects a speech content image 21a, a response image 21b, and a response related image 21c on the wall 20 in response to a speech "what will the weather be like tomorrow?" from a user. The speech content image 21a indicates contents of the recognized speech, the response image 21b indicates the response "tomorrow will be sunny" converted into the text, and the response related image 21c is associated with the contents of the response. Accordingly, the user can understand that the speech from the user is correctly recognized by the information processing device 1, and can visually recognize a response to the speech.

The overview of the speech recognition system according to the present disclosure has been described. Noe that, the shape of the information processing device 1 is not limited to the circular cylindrical shape as illustrated in FIG. 1. For example, the shape of the information processing device 1 may be a cube, a sphere, a polyhedron, or the like. Next, a basic configuration and an operation process of the information processing device 1 that implements the speech recognition system according to the embodiment of the present disclosure will be described.

2. Basic Configuration

Figure 2:
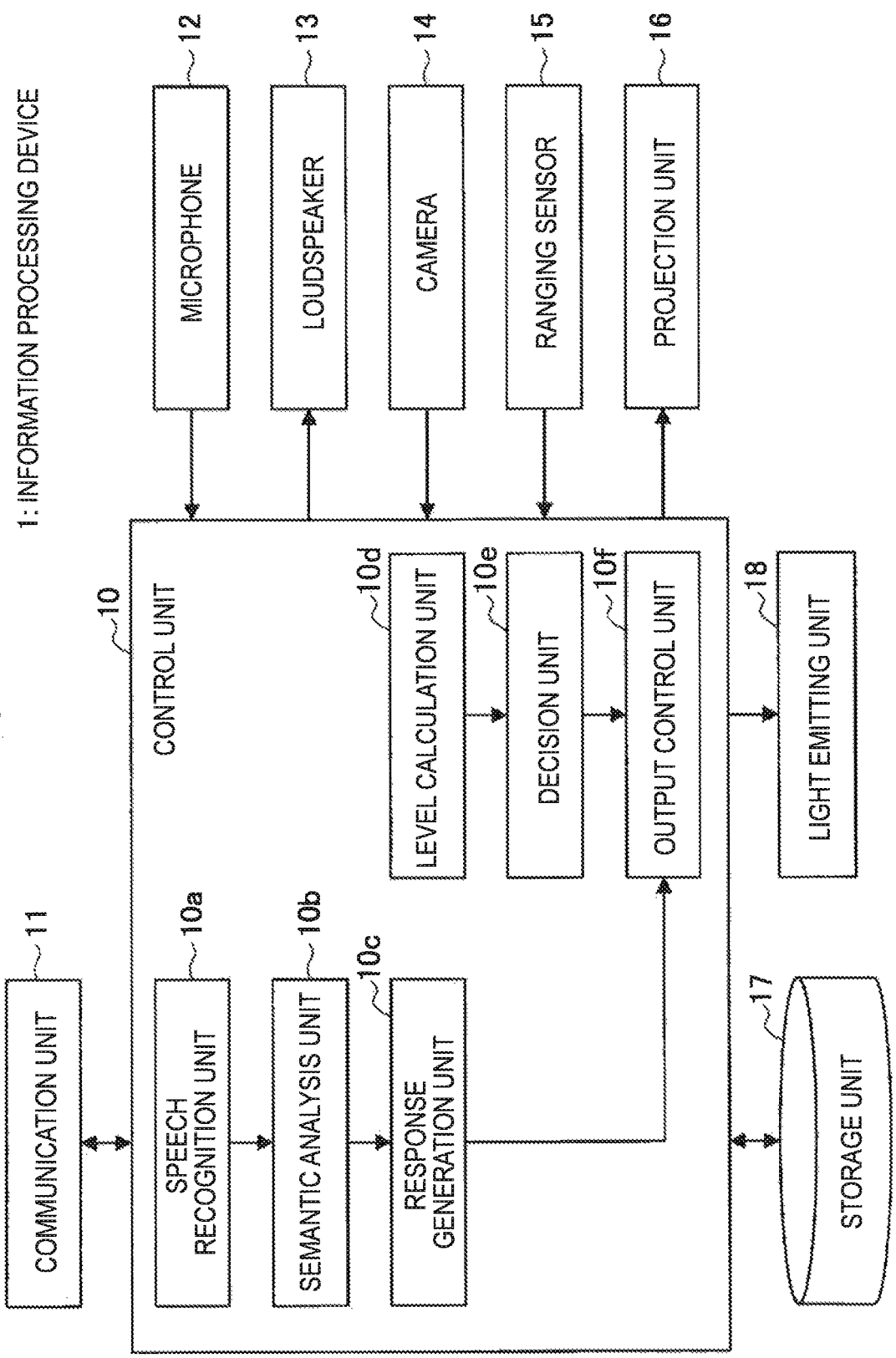
FIG. 2 is a diagram illustrating an example of a configuration of an information processing device according to the embodiment.

FIG. 2 is a diagram illustrating an example of the configuration of the information processing device 1 according to the embodiment. As illustrated in FIG. 2, the information processing device 1 includes a control unit 10, a communication unit 11, a microphone 12, a loudspeaker 13, a camera 14, a ranging sensor 15, a projection unit 16, a storage unit 17, and a light emitting unit 18.

(Control Unit 10)

The control unit 10 controls respective structural elements of the information processing device 1. The control unit 10 is implemented by a microcontroller including a central processing unit (CPU), a read only memory (ROM), a random access memory (RAM), and a non-volatile memory. In addition, as illustrated in FIG. 2, the control unit 10 according to the embodiment also functions as a speech recognition unit 10a, a semantic analysis unit 10b, a response generation unit 10c, a level calculation unit 10d, a decision unit 10e, and an output control unit 10f.

The speech recognition unit 10a recognizes a voice of a user collected by the microphone 12 of the information processing device 1, converts the voice into a character string, and acquires a speech text. In addition, it is also possible for the speech recognition unit 10a to identify a person who is speaking on the basis of a feature of the voice, or to estimate a voice source (in other words, direction of speaker).

By using natural language processing or the like, the semantic analysis unit 10b performs semantic analysis on the speech text acquired by the speech recognition unit 10a. A result of the semantic analysis is output to the response generation unit 10c.

The response generation unit 10c generates a response to the speech from the user on the basis of the semantic analysis result. For example, in the case where the speech from the user requests "tomorrow's weather", the response generation unit 10c acquires information on "tomorrow's weather" from a weather forecast server on a network, and generates a response.

The level calculation unit 10d calculates an allowable output level of a response on the basis of a current surrounding environment. In this specification, the allowable output level of the response indicates a degree of response output that is allowed by a user (or a degree of response output favorable to the user). For example, the allowable output level is calculated to be high in an environment in which output using voice is preferable, and the allowable output level is calculated to be low in an environment in which output using voice is not preferable but output using display is preferable. In addition, in the environment in which output using display is preferable, the allowable output level is calculated to be more lower if it is desirable to limit a display content, select a display device, or limit brightness in accordance with a surrounding environment of the user. On the other hand, also in an environment in which output using voice is preferable, the allowable output level is calculated to be low if an audio volume has to be lowered in accordance with a surrounding environment of the user. On the other hand, the allowable output level is calculated to be high if the audio volume has to be raised. Note that, the "allowable output level" according to the embodiment may be referred to as a so-called silent mode level. In this case, the silent mode level is calculated to be low in the environment in which output using voice is preferable, and the silent mode level is calculated to be high in the environment in which the output using voice is not preferable but output using display is preferable.

In addition, various factors are used to determine the surrounding environment (in other words, system usage environment). Therefore, the level calculation unit 10d determines a current surrounding environment in accordance with at least one or more of the various factors (to be described below) and calculate an appropriate allowable output level.

Time Slot

The level calculation unit 10d may calculate the allowable output level in accordance with a time slot. For example, in the case of night, it is necessary to respect neighboring houses and people who are sleeping. Therefore, the level calculation unit 10d calculates a low allowable output level. The allowable output levels according to time slots may be set in advance by a user or a system. In addition, the time slot may be acquired from a clock unit (not illustrated) embedded in the information processing device 1, or from a predetermined server on a network.

Existence of External Sound Source

The level calculation unit 10d may calculate the allowable output level in accordance with existence of an external sound source. For example, in an environment in which there is the external sound source such as a TV, a radio, a music loudspeaker, construction noise, and the like, the response output using voice is not preferable since the response output using voice interferes with existence of the external sound source. Therefore, the level calculation unit 10d calculates a low allowable output level such that the output method is switched to "display". In addition, in the case of an important response, the level calculation unit 10d may calculate a high allowable calculation level although there is an external sound source, such that audio volume of the response output is raised to prevent the response from being washed out by the external sound source. Note that, the external sound source includes conversation between people without the voice UI and conversation on the phone. The existence of the external sound source is detected on the basis of a sound signal collected by the microphone 12 provided on the information processing device 1. In addition, sometimes sound of the information processing device 1 itself (own sound) is input to the microphone 12. However, the own sound can be canceled by an echo canceller or the like, and the control unit 10 can detect the genuine external sound source only.

User Environment

The level calculation unit 10d may calculate the allowable output level in accordance with surroundings of a user who is a target (in other words, user environment). For example, when a person (including a baby) is sleeping near the user, such a situation is in an environment in which output using voice is not preferable. Therefore, the level calculation unit 10d calculates a low allowable output level such that the output method is switched to "display". In addition, the level calculation unit 10d may calculates a more lower allowable output level such that brightness of a display device is lowered so as not to disturb the sleeping person by the light of the display device when display is output. Note that, the level calculation unit 10d may acquire illuminance in a room that is detected by an illuminance sensor (not illustrated) of the information processing device 1 as the surroundings of the user, and may calculate the allowable output level.

Alternatively, in the case where the information processing device 1 is installed in a household space and a non-registered user such as a guest is in the vicinity of the user, the level calculation unit 10d calculates a low allowable output level such that output using display is performed instead of output using voice in consideration of privacy with regard to response contents. In addition, in the case of focusing on privacy protection, the level calculation unit 10d calculates a more lower allowable output level such that the output method is switched to an output method that causes a communication terminal such as a smartphone held by the user to perform display instead of display through projection on the wall 20. The microphone 12, camera 14, and the like provided on the information processing device 1 may acquire surroundings of the user.

Appearance of User

The level calculation unit 10d may calculate the allowable output level in accordance with appearance of the user. For example, when the user speaks in low voices, it is expected that the voice UI responds in low voices too, and it is determined that the user is in an environment in which a loud voice is not appropriate. Therefore, the level calculation unit 10d calculates a low allowable output level. Note that, it may be determined whether the voice is low by comparing with a usual voice volume of a speech from the user, or on the basis of behavior such as covering his/her mouse with hand. The microphone 12, camera 14, and the like provided on the information processing device 1 may acquire the appearance of the user. In addition, in the case where the user explicitly designates the allowable output level by himself/herself through a voice command, gesture, device operation (such as operation of a hardware button (not illustrated), operation of a remote controller (not illustrated), and the like, the level calculation unit 10d may calculate the allowable output level on the basis of the designated allowable output level.

Position of User

The level calculation unit 10d may calculate the allowable output level in accordance with a position of the user with respect to the information processing device 1. For example, in the case where the user is in the vicinity of the information processing device 1, the level calculation unit 10d may calculate a low allowable output level since the user can hear an output response even when the audio volume of the output response is lowered. By lowering the audio volume, it becomes difficult for another person at a distant location to hear the output response while the target user who is in the vicinity of the device can hear the output response. Therefore, it is possible to suppress leakage of the sound of the response. For example, the position of the user with respect to the information processing device 1 may be acquired by the ranging sensor 15 provided in the information processing device 1.

Consideration of Accessibility

The level calculation unit 10d may calculate the allowable output level in consideration of accessibility. For example, in the case of a hearing-impaired user, an elder, or a person who asks again many times, the level calculation unit 10d calculates a low allowable output level such that a response is output by display instead of voice. Thereby, the user can use the voice UI without stress. On the other hand, in the case of a user with bad eyesight or a user without glasses that is usually worn, the level calculation unit 10d may calculate a high allowable output level such that a response is output by voice instead of display. For example, information on a physical characteristic of a user that is used in the case where the accessibility is considered may be acquired from the storage unit 17.

The factors used when determining a surrounding environment have been described above. The level calculation unit 10d calculates an allowable output level that is appropriate to a current surrounding environment on the basis of at least one or more of the above described factors. Alternatively, the level calculation unit 10d may calculate a final allowable output level by summing weighted allowable output levels calculated for the respective factors.

The decision unit 10e decides a response output method in accordance with a current surrounding environment. For example, the decision unit 10e decides the response output method on the basis of the allowable output level calculated by the level calculation unit 10d. For example, the response output method is assumed to be an output method using voice or an output method through image display (including image display through projection). In addition, the audio volume, directivity in the case of voice output, or selection of a display device (projection unit 16 (main display)/sub-display/cooperating external display device), brightness adjustment, or the like in the case of display output is decided.

The output control unit 10f performs control such that a response generated by the response generation unit 10c is output in accordance with the response output method decided by the decision unit 10e. A specific response output example according to the embodiment will be described later.

(Communication Unit 11)

The communication unit 11 exchanges data with an external device. For example, the communication unit 11 connects with a predetermined server on a network, and receives information necessary for the response generation unit 10c to generate a response. In addition, the communication unit 11 cooperates with peripheral devices and transmits response data to a target device under the control of the output control unit 10f.

(Microphone 12)

The microphone 12 has a function of collecting peripheral sounds and outputting the collected sound to the control unit 10 as a sound signal. In addition, the microphone 12 may be implemented by array microphones.

(Loudspeaker 13)

The loudspeaker 13 has a function of converting the sound signal into a voice and outputting the voice under the control of the output control unit 10f.

(Camera 14)

The camera 14 has a function of capturing an image of periphery by using an imaging lens provided on the information processing device 1, and outputting the captured image to the control unit 10. The camera 14 may be implemented by a 360-degree camera, a wide angle camera, or the like.

(Ranging Sensor 15)

The ranging sensor 15 has a function of measuring a distance between a user and the information processing device 1 and distances between people around the user and the information processing device 1. For example, the ranging sensor 15 may be implemented by an optical sensor (a sensor configured to measure a distance from a target object on the basis of information on phase difference between a light emitting timing and a light receiving timing).

(Projection Unit 16)

The projection unit 16 is an example of a display device, and has a function of projecting and displaying an (enlarged) image on a wall or a screen.

(Storage Unit 17)

The storage unit 17 stores programs for causing the respective structural elements in the information processing device 1 to function. In addition, the storage unit 17 stores various parameters and various thresholds. The various parameters are used when the level calculation unit 10d calculates an allowable output level. The various thresholds are used when the decision unit 10e decides an output method in accordance with the allowable output level. In addition, the storage unit 17 stores registration information of users. The registration information of a user includes individual identification information (feature of voice, facial image, feature of person image (including image of body), name, identification number, or the like), age, sex, hobby/preference, an attribute (housewife, office worker, student, or the like), a feature (visually impaired, hearing-impaired, or the like) connection information regarding a communication terminal held by the user, or the like.

(Light Emitting Unit 18)

The light emitting unit 18 may be implemented by light emitting elements such as LEDs, and lighting manners and lighting positions of the light emitting unit 18 can be controlled such that all lights are turned on, a part of the light is turned on, or the lights are blinking. For example, under the control of the control unit 10, a part of the light emitting unit 18 in a direction of a speaker recognized by the speech recognition unit 10a is turned on. This enables the information processing device 1 to operate as if the information processing device 1 looks on the direction of the speaker.

The details of the configuration of the information processing device 1 according to the embodiment have been described above. Note that, the configuration illustrated in FIG. 2 is a mare example. The embodiment is not limited thereto. For example, the information processing device 1 may further include an infrared (IR) camera, a depth camera, a stereo camera, a motion detector, or the like to acquire information on a surrounding environment. In addition, installation positions of the microphone 12, the loudspeaker 13, the camera 14, the light emitting unit 18, and the like in the information processing device 1 are not specifically limited. In addition, the respective functions of the control unit 10 according to the embodiment may be in a cloud connected via the communication unit 11.

3. Operation Process

Next, with reference to FIG. 3, details of an operation process in the speech recognition system according to the embodiment will be described.

Figure 3:
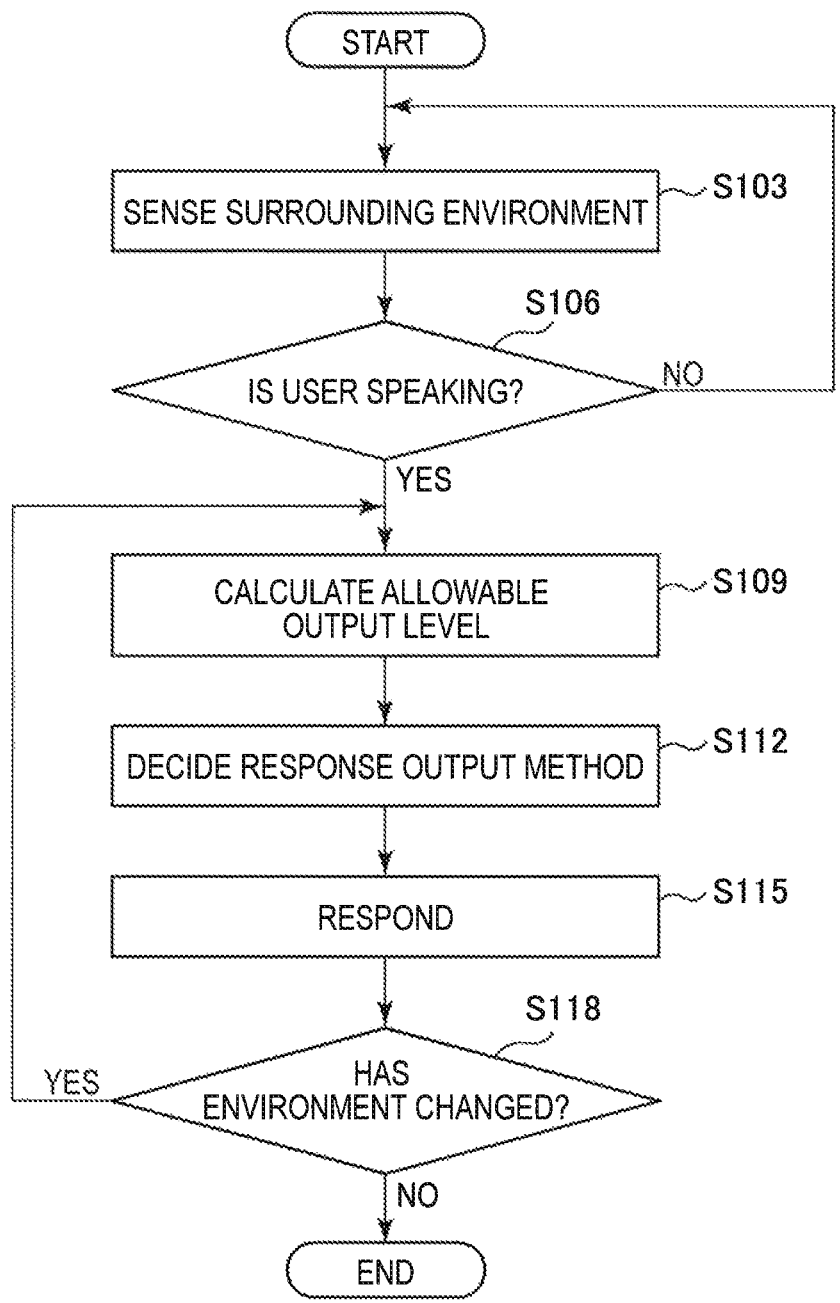
FIG. 3 is a flowchart illustrating an operation process of a speech recognition system according to the embodiment.

FIG. 3 is a flowchart illustrating an operation process of the speech recognition system according to the embodiment. As illustrated in FIG. 3, the information processing device 1 first senses a surrounding environment by using various sensors in Step S103. Specifically, the information processing device 1 may acquire existence of an external sound source, a position, state, or the like of a person near the information processing device 1 (including user) by using the microphone 12, the camera 14, or the ranging sensor 15. In addition, the information processing device 1 may acquire current time from the clock unit (not illustrated) embedded in the information processing device 1 or a predetermined server on a network. Note that, the sensing of the surrounding environment in S103 may continue in parallel with processes described below.

Next, in Step S106, the control unit 10 of the information processing device 1 detects a speech from a user by performing speech recognition and semantic analysis on a sound signal collected by the microphone 12. In other words, in the control unit 10, the speech recognition unit 10a recognizes the sound signal collected by the microphone 12, the semantic analysis unit 10b performs the semantic analysis on a converted character string, a speech is detected, and a result of the semantic analysis performed on the detected speech is output to the response generation unit 10c.

Next, in Step S109, the level calculation unit 10d calculates an allowable output level on the basis of a current surrounding environment. Specifically, the level calculation unit 10d calculates an allowable output level indicating whether it is an environment in which response output using voice is preferable (allowed), on the basis of various factors in a system usage environment (such as existence of external sound source, user environment, user behavior, or position of user).

Next, in Step S112, the decision unit 10e decides a response output method on the basis of the allowable output level calculated by the level calculation unit 10d. For example, in the case where an allowable output level indicating that it is an environment in which the response output using voice is not preferable is calculated, the decision unit 10e decides to use an output method using display.

Next, in Step S115, the output control unit 10f performs control such that a response to a speech from the user generated by the response generation unit 10c in response to the result of semantic analysis performed on the speech by the semantic analysis unit 10b is output by using the output method decided by the decision unit 10e. Therefore, by using the voice UI system according to the embodiment, it is possible to respond by automatically deciding an optimal output method such as the display output in accordance with the environment, without limiting the response to the speech from the user to a voice response. For example, in the case of night or in the case where a baby is sleeping near a user, a voice response is not preferable. Therefore, the information processing device 1 displays a response by projecting a response image through the projection unit 16 such that the response is output by using the optimal output method. Details of such a response output example will be described below.

4. Response Output Example

<4-1. Response Output Using Voice>

As described above, the information processing device 1 (voice UI agent function) according to the embodiment outputs a response by voice in the case of a high allowable output level. For example, in the case where an allowable output level is higher than a first threshold, the decision unit 10e of the information processing device 1 decides to use an output method that outputs a response by voice of a usual audio volume toward every direction from the loudspeaker 13.

Alternatively, in the case where an allowable output level is lower than the first threshold, the decision unit 10e decides to use an output method that outputs a response from the loudspeaker 13 by voice of an audio volume that is smaller than the usual audio volume. At this time, it is possible to instruct the user to approach the device by voice or display in the case where the information processing device 1 recognizes the position of the user through the ranging sensor 15 or the like and the user is at a position far away from the information processing device 1. In addition, in the case where the loudspeaker 13 is a directional loudspeaker, the decision unit 10e may decide to use an output method using voice that controls directivity such that the voice is delivered only to a target user. By using the output methods described above, it is possible to prevent the response from being heard by people other than the target user.

<4-2. Responses Output Using Display>

In addition, in the case of a low allowable output level, the voice UI according to the embodiment switches the response output to the response output using display while avoiding the response output using voice. For example, in the case where an allowable output level is lower than a second threshold, the decision unit 10e of the information processing device 1 decides to output a response by display instead of voice. Specifically, the decision unit 10e decide to use a display method that projects the response image 21b or the response related image 21c indicating the response on the wall 20 by using the projection unit 16 (see FIG. 1).

(Brightness Adjustment)

In addition, in the case where the allowable output level is lower than a third threshold, the decision unit 10e decides to use a method that outputs a response after lowering brightness of the display device. This enables to avoid a situation in which the display device is suddenly turned on and lighted up (or projection starts) in response to a speech from a user and awakes a sleeping person in the case of night or in the case where someone is sleeping near the device. Note that, with regard to the first to third thresholds, the second threshold is lower than the first threshold, and the third threshold is lower than the second threshold.

(Sub-Display)

Figure 4:
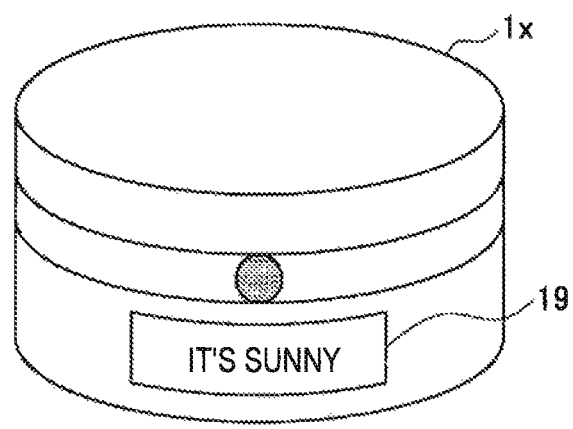
FIG. 4 is a diagram illustrating an example of an information processing device provided with a sub-display according to the embodiment.

In addition, in the case where the sub-display is provided on the information processing device 1, it is also possible for the decision unit 10e to decide to use an output method using the sub-display in accordance with an allowable output level. Here, FIG. 4 illustrates an example of an information processing device 1x provided with a sub-display 19. As illustrated in FIG. 4, the sub-display 19 is provided on a side surface of the information processing device 1x having a circular cylindrical shape. In comparison with display generated by the projection unit 16, the sub-display 19 has a smaller display region and it is assumed that the display of the sub-display is limited such as low resolution. However, by displaying a response sentence as a simple text, it is possible to output a response through the sub-display 19. In addition, by responding through such a small display region, it is possible to prevent contents of the response from being seen by people other than the user, which can protect privacy.

<4-3. Response Output in Cooperation with Equipment>

In addition, in the case where it is possible for the information processing device 1 according to the embodiment to cooperate with an external device, the information processing device 1 also can decide to use a method that outputs a response from the external device in accordance with an allowable output level. For example, the decision unit 10c may decide to use a method that outputs display from a display screen such as a TV, a PC, or the like installed near the information processing device 1, or a method that transmits a push notification to a communication terminal held by the user such as a mobile phone terminal, a smartphone, a wearable terminal, or the like through a predetermined application or an e-mail. Note that, in the case where the TV or the PC is being used by another person, a response is not output to such devices so as not to bother the another person. In addition, in the case where a response is output from the communication terminal held by the user, the output control unit 10f may display information that the response is output from the communication terminal on the sub-display 19, and may notify the user of the information. Hereinafter, the following description is given with reference to FIG. 5.

Figure 5:
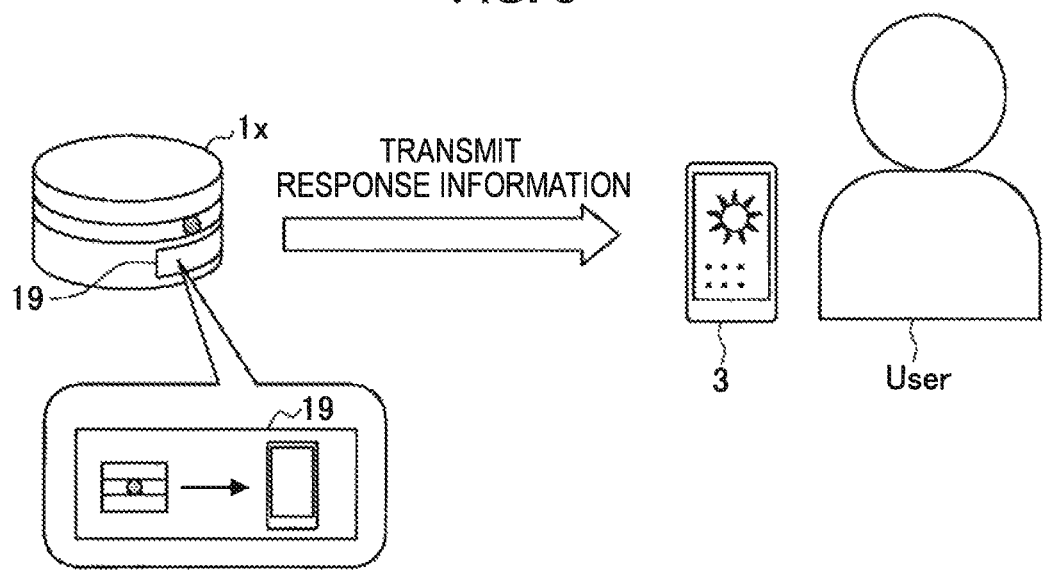
FIG. 5 is a diagram illustrating a case where a sub-display notifies that a communication terminal outputs a response according to the embodiment.

FIG. 5 is a diagram illustrating a case where the sub-display 19 notifies that a communication terminal 3 outputs a response according to the embodiment. For example, in the case where the information processing device 1 transmits response information to the communication terminal 3 held by the user and the communication terminal 3 outputs a response as illustrated in FIG. 19, the sub-display 19 displays an icon or the like indicating that the response information is transmitted to the communication terminal 3. Therefore, the user can intuitively recognize that the response is output from his/her own communication terminal 3.

In addition, the decision unit 10e can decide to use a method that outputs a response from a display device such as a TV in another room (user's private room) other than a room in which the information processing device 1 is installed, in cooperation with the display device installed in the another room. Accordingly, it is possible to prevent people around the user from seeing contents of the response and to prevent people sleeping near the user from waking up. In addition, in this case, the output control unit 10f notifies the user that the response is output from the display device in the another room by displaying such information on the sub-display 19.

In addition, in the case where the user is using a sound output device such as earphones or headphones, the decision unit 10e may decides to use a method that outputs a response from the sound output device. In this case, the output control unit 10f transmits a sound signal to respond to the sound output device via the communication unit 11. In addition, the decision unit 10e may decide to use a method that also outputs a response from a display screen of the mobile phone terminal, the smartphone, the wearable terminal, or the like held by the user, which enables to output responses by both voice and display.

<4-4. Dynamic Response Output>

In addition, the decision unit 10e according to the embodiment may change the response output method during conversation in accordance with an allowable output level that changes as a surrounding environment that is continuously observed changes.

For example, in the case where an allowable output level is lowered due to a certain factor during usual voice conversation, the decision unit 10e may switch to output using display during the conversation. At this time, in the case where the conversation is cut halfway, the output control unit 10f displays a content of last conversation such that the conversation between the user and the voice UI continues smoothly. On the other hand, in the case where an allowable output level is raised due to a certain factor during conversation through output using voice and display, the decision unit 10e may switch to output using voice during the conversation. At this time, in the case where the conversation is cut halfway, the output control unit 10f outputs responses by both display and voice in parallel until current conversation finishes, which enables smooth switch of response output methods.

<4-5. Notification of Allowable Output Level>

In addition, according to the embodiment, it is also possible to notify a user of a current allowable output level by displaying an icon or the like on the sub-display 19 or projecting the icon or the like on the wall 20. Therefore, the user can intuitively recognize that output is limited in accordance with the settings of the allowable output level. Next, FIG. 6 illustrates a display example indicating allowable output levels according to the embodiment.

Figure 6:
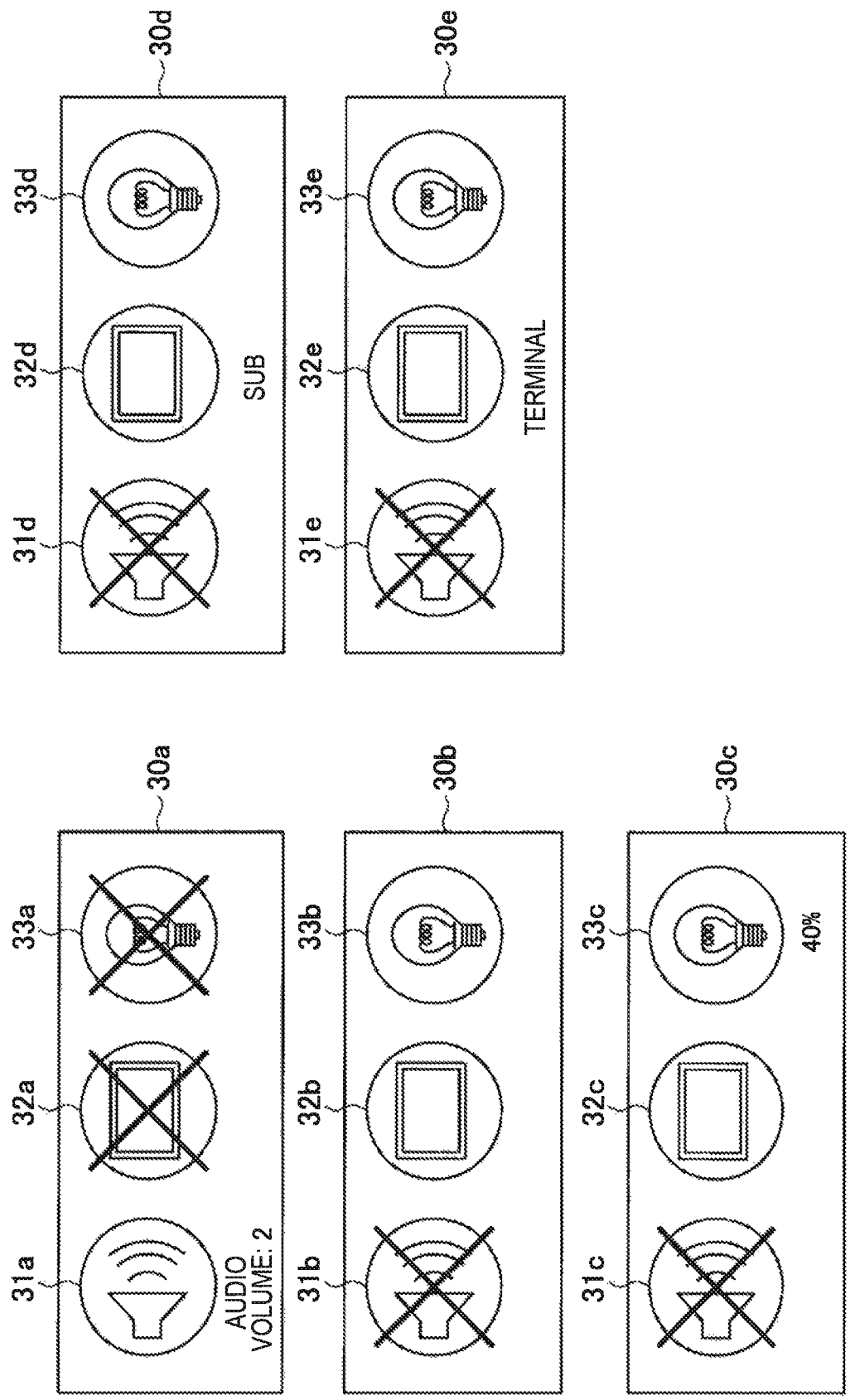
FIG. 6 is a diagram illustrating a display example indicating allowable output levels according to the embodiment.

As illustrated in display examples 30a to 30e in FIG. 6, the allowable output level is represented by an icon 31, an icon 32, and an icon 33. The icon 31 indicates a voice output state, the icon 32 indicates a display output state, and the icon 33 indicates a state of brightness during display output.

For example, in the display example 30a in the left side of the first row in FIG. 6, cross marks are on an icon 32a indicating a display output state and an icon 33a indicating a brightness state, and no cross mark is on an icon 31a. This means the device is in the voice output state. In addition, the wording "AUDIO VOLUME: 2" is displayed under the icon 31a indicating the voice output state, which clearly represents details of the voice output state. For example, in the case where a normal audio volume is 5, it is understood that the audio volume is controlled to be low in accordance with the allowable output level.

In the display example 30b in the left side of the second row in FIG. 6, the cross mark is on an icon 31b indicating the voice output state and no cross mark is on icons 32b and 33b. This means that the device is in the display output state.

In the display example 30c in the left side of the third row in FIG. 6, the cross mark is on an icon 31c indicating the voice output state and no cross mark is on icons 32c and 33c. This means that the device is in the display output state. In addition, the wording "40%" is displayed under the icon 33c indicating the brightness state, which represents that the brightness of the display device is limited in accordance with the allowable output level.

In the display example 30d in the right side of the first row in FIG. 6, the cross mark is on an icon 31d indicating the voice output state and no cross mark is on icons 32d and 33d. This means that the device is in the display output state. In addition, the wording "SUB" is displayed under the icon 32d indicating the display output state, which represents that the sub-display 19 whose display region or the like is limited outputs a response in accordance with the allowable output level.

In the display example 30e in the right side of the second row in FIG. 6, the cross mark is on an icon 31e indicating the voice output state and no cross mark is on icons 32e and 33e. This means that the device is in the display output state. In addition, the wording "TERMINAL" is displayed under the icon 32e indicating the display output state, which represents that a response is output from a communication terminal such as a smartphone, a mobile phone, a tablet terminal, or a wearable terminal owned by the user in accordance with the allowable output level.

The display examples of the allowable output level have been described above with reference to FIG. 6. However, the display example in FIG. 6 is a mere example, and the notification of the allowable output level according to the embodiment is not limited thereto. For example, the information processing device 1 may display the quantified allowable output level, or may display a stage in the case where the allowable output level involves stages. In addition, the information processing device 1 may control the light emitting unit 18 such that the light emitting unit 18 emits light of a predetermined color indicating a stage of the allowable output level, or the information processing device 1 may indirectly indicate that the device is in an output limiting mode (in which output is limited in accordance with the allowable output level) by lowering the brightness of the light emitting unit 18.

5. Output in Multi-User Environment

<5-1. Overview>

Next, as another example of the embodiment, output in a multi-user environment will be described. In the above described embodiment, the description has been given basically on the assumption that there is only one user. However, it is also assumed that there are a plurality of users in the household space or the like.

For example, JP 2015-18502A describes an information processing device that notifies an entire family of an error occurred in a household device, and provides appropriate solutions in accordance with attitudes of respective users by using an SNS system by which the entire family can exchange messages. This patent literature is based on the premise that there is a plurality of users and provides solutions according to the attitudes of the respective users. However, this patent literature does not consider that anonymity (hiding a destination of notification) and secrecy (hiding contents of the notification) are necessary as the nature of the notification.

For example, in the case where the information processing device 1 is placed in a living room or the like where family members get relaxed, notification to a certain user in front of another family member lets the another family member to know the contents of the notification. However, it is assumed that, depending on the contents of the notification, sometimes the user does not want the other people to know the contents of the notification.

Therefore, as the another example of the embodiment, a system of outputting (a notification) to a specific user will be described on the premise that the device is used by a plurality of users.

The shape of an information processing device 1a according to the another example of the embodiment is not specifically limited. For example, the information processing device 1a may have a circular cylindrical shape in a way similar to the information processing device 1 that has been described with reference to FIG. 1, or may have a cube shape, a sphere shape, a polyhedron shape, or the like. In addition, the information processing device 1a is placed on a floor, a table, or the like in a room. In addition, the information processing device 1a may be a self-propelled robot. Next, with reference to FIG. 7, a configuration of the information processing device 1a will be described.

<5-2. Configuration>

Figure 7:
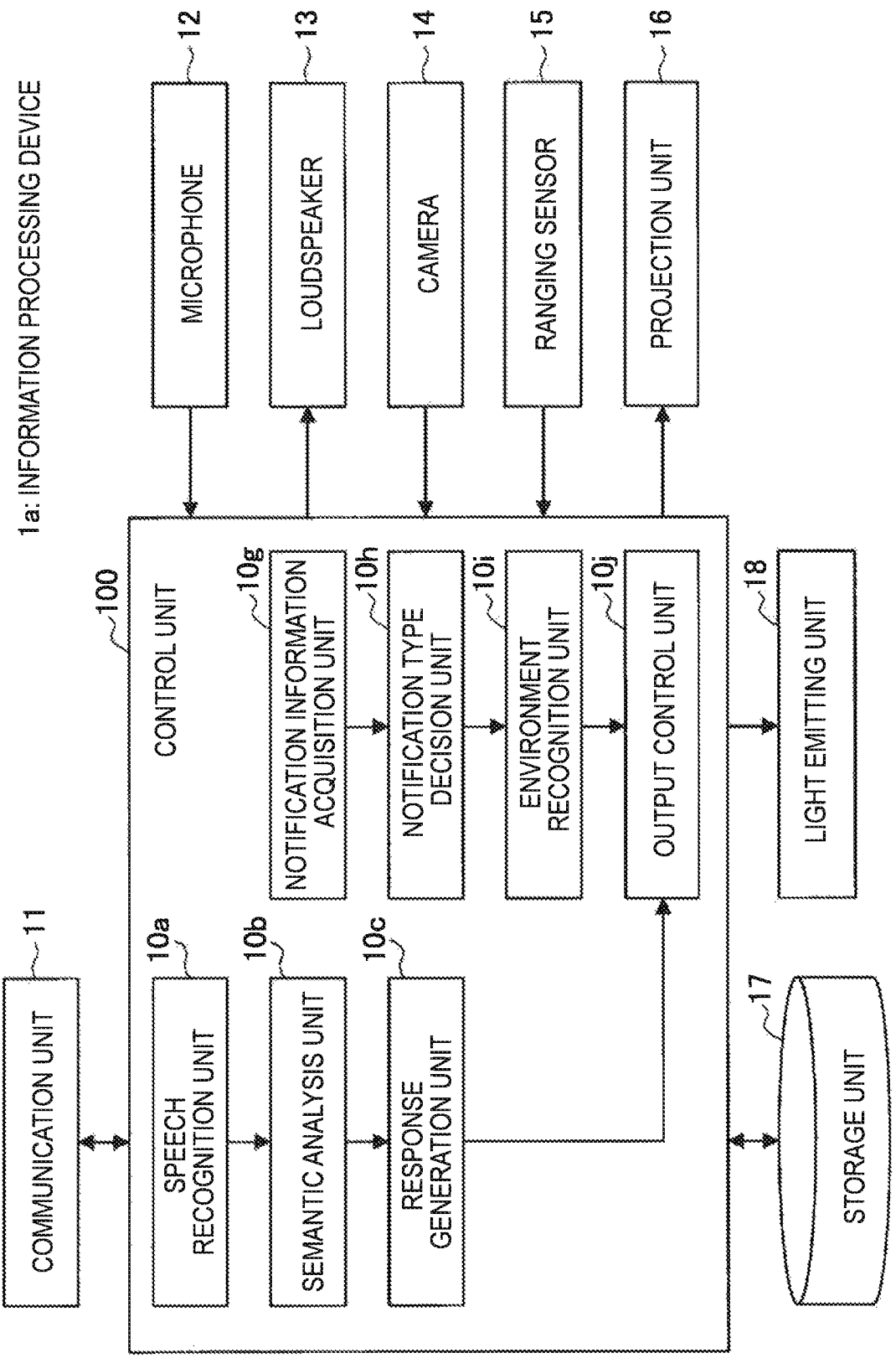
FIG. 7 is a diagram illustrating an example of a configuration of an information processing device according to another example of the embodiment.

FIG. 7 is a diagram illustrating an example of the configuration of the information processing device 1a according to the another example of the embodiment. As illustrated in FIG. 7, the information processing device 1a includes the control unit 100, the communication unit 11, the microphone 12, the loudspeaker 13, the camera 14, the ranging sensor 15, the projection unit 16, the storage unit 17, and the light emitting unit 18. Description of the structural elements having the same reference numerals as the configuration described with reference to FIG. 2 will be omitted.

The control unit 100 controls respective structural elements of the information processing device 1a. The control unit 100 is implemented by a microcontroller including a CPU, a ROM, a RAM, and a non-volatile memory. In addition, as illustrated in FIG. 7, the control unit 100 according to the embodiment also functions as the speech recognition unit 10a, the semantic analysis unit 10b, the response generation unit 10c, a notification information acquisition unit 10g, a notification type decision unit 10h, an environment recognition unit 10i, and an output control unit 10j.

The speech recognition unit 10a, the semantic analysis unit 10b, and the response generation unit 10c have functions similar to the configurations described using the same reference numerals with reference to FIG. 2.

The notification information acquisition unit 10g acquires notification information to a user. For example, the notification information acquisition unit 10g acquires notification information that is automatically transmitted by a system. Examples of the notification information include reminder notification based on schedule information of a user, general notification information such as weather, traffic information, and news, message notification to a specific user, and the like. Such notification information may be acquired from the storage unit 17, or may be acquired from a network via the communication unit 11.

The notification type decision unit 10h decides a type (in other words, category) of the notification information acquired by the notification information acquisition unit 10g. The type of the notification according to the embodiment is set as follows on the basis of openness of the notification and a target user of the notification.

Public all: Notification to all users. All the users can recognize this notification. This notification is assumed to be general information notification, notification to an entire family, and the like.

Public person: All the user can recognize this notification, but this notification is targeted at a specific user. For example, this notification is assumed to be notification to a specific person in a family (such as reminder notification to mother).

Private group: Only people in a specific group can recognize this notification. Examples of the group include "adult", "parents", "woman", "child", "relatives", and the like. A group setting can be customized in advance by a user.

Private person: Only a specific user can recognize this notification, and this notification is targeted at the specific user.

The notification type decision unit 10h decides a type (category) of the acquired notification information in accordance with contents of the notification. For example, the notification type decision unit 10h determines whether the type of the notification is "Public all", "Public person", "Private group", or "Private person" in accordance with the type and the destination of the notification. In addition, the notification type may be arbitrarily set by the user in advance. In addition, in the case where the user explicitly designates a notification target in advance, the notification type decision unit 10h decides that the notification is "Private" notification. Alternatively, notification type may be set for each application that is a source of the notification information. For example, schedule notification to an individual regarding a scheduler may be set as Private person.

The environment recognition unit 10i recognizes a surrounding environment. For example, the environment recognition unit 10i recognizes positions of surrounding users and users around the device (for example, facial recognition) on the basis of an image of surroundings captured by the camera 14 and sensor data obtained by the ranging sensor 15. In addition, it is also possible for the environment recognition unit 10i to acquire an attribute such as sex or age from the captured image or the like, and recognize a group of surrounding people. For example, on the basis of the captured image, the environment recognition unit 10i recognizes a parents group, a child group, a woman group, a guest group (people other than family), and a customized group (such as father and A-chan).

The output control unit 10j performs control such that a response generated by the response generation unit 10c is output from the loudspeaker 13, the projection unit 16, or the light emitting unit 18.

In addition, the output control unit 10j performs appropriate output (user notification) from the loudspeaker 13, the projection unit 16, or the light emitting unit 18 in accordance with a result of environment recognition performed by the environment recognition unit 10i and a notification type decided by the notification type decision unit 10h. For example, in the case of Public notification ("Public all" or "Public person"), the output control unit 10j performs control such that notification is output by using a method by which all the users can recognize the notification. In the case of Private notification ("Private group" or "Private person"), the output control unit 10j performs control such that notification is output by using a method by which only a target user can recognize the notification. At this time, the output control unit 10j may change the notification method in accordance with a surrounding environment. Details of the notification methods will be described later with reference to FIG. 9A and FIG. 9B.

<5-3. Operation Process>

Next, with reference to FIG. 8, an operation process according to the another example of the present embodiment will be described. FIG. 8 is a flowchart illustrating a notification process according to the another example of the embodiment.

As illustrated in FIG. 8, first it is determined that whether there is notification information to a user (Step S203).

Next, in the case where there is the notification information (in other words, in the case where the notification information acquisition unit 10g has acquired the notification information to the user) (YES in Step S203), the notification type decision unit 10h decides a notification type of the notification information (Step S206).

Next, the environment recognition unit 10i acquires surrounding environment information (Step S209) and recognizes a surrounding environment (Step S212). For example, the environment recognition unit 10i recognizes a direction (position) of a user by using the ranging sensor 15, or recognizes a face of a surrounding user by using the camera 14.

Next, the output control unit 10j determines whether notification is possible in accordance with the type of the notification and a current environment (Step S218). For example, in the case where the notification type is Private, the output control unit 10j determines that the notification is impossible when there is a plurality of users around the device, and determines that the notification is possible when there is only a target user around the device. Alternatively, in the case where the notification type is Public, the output control unit 10j determines that the notification is possible even when there are a plurality of users around the device.

In the case where it is determined that the notification is impossible (NO in Step S218), the output control unit 10j may add the notification information to a notification queue stored in the storage unit 17, and postpone the notification, for example. In this case, the above described operation process is repeated at a predetermined time interval, and in Step S203, the notification information acquisition unit 10g also acquires notification information from the notification queue.

On the other hand, in the case where it is determined that the notification is possible (YES in Step S218), the output control unit 10j performs control such that notification is issued by using an appropriate notification method.

The notification process according to the another example of the embodiment has been described above. Next, details of the notification method according to the notification type and the environment will be described with reference to FIG. 9A and FIG. 9B.

<5-4. Notification Example>

(5-4-1. Public Notification)

FIG. 9A is a diagram illustrating a method of Public notification. The left side of FIG. 9A illustrates a notification example of the Public all type. It is assumed that the Public all type includes general information notification to an entire family (weather, traffic information, news, or family member's schedule), and recommendation information to family members (photographs, music, or the like). Specifically, for example, as illustrated in FIG. 9A, the information processing device 1a outputs a speech such as "Today, you may be in for some rain in the evening" from the loudspeaker 13, or emits light (light (color, blinking, or the like) that is set in advance in accordance with contents of the notification) from the light emitting unit 18. In addition, in the case where a display unit is provided on the information processing device 1a, the notification information may be displayed on the display unit, or may be projected on the wall or the like by using the projection unit 16. Alternatively, in the case where the information processing device 1a has a function of outputting aroma (smell), the information processing device 1a may issue notification by a speech, light emission, display, projection, or the like after outputting the aroma such that all the user realize that the notification information will be issued and attracting attention from the users.

The right side of FIG. 9A illustrates a notification example of the Public person type. It is assumed that the Public person type includes notification to a specific user that allows an entire family to recognize the contents of the notification (notification without secrecy), such as message notification in a family. Specifically, for example, as illustrated in FIG. 9A, the information processing device 1a outputs "father said he doesn't need dinner today" by voice with regard to a message from the father. In the case where a destination of the message is a mother, the light emitting unit 18 emits light of a color indicating the mother. When issuing a message by voice, the destination of the message can be identified from color of the light emitting unit 18, music (background music (BGM)) output from the loudspeaker 13, a tone of a speech voice, aroma, or the like. Alternatively, when issuing the message by display or projection, the destination of the message may be indicated by text such as "Mom, father said he doesn't need dinner today".

(5-4-2. Private Notification)

FIG. 9B is a diagram illustrating a method of Private notification. The left side of FIG. 9B illustrates a notification example of the Private group type. It is assumed that the Private group type includes notification to a specific group, the notification including secrecy, such as notification to parents that should be kept a secret from their child (notification regarding a present for their child, notification regarding a trouble with a friend of their child, or advise on school expenses). In this case, as illustrated in FIG. 9B, the information processing device 1a issues the notification only to a specific group such as the parents group. Specifically, for example, the information processing device 1a draws users in the specific group near the information processing device 1a and tell them "the ABC doll came in the stock" (information on the present for their child) in a low voice, or outputs the voice to earphones connected in a wired/wireless manner (such as Blue tooth (registered trademark)). By drawing the notification target users in the specific group near the information processing device 1a, it is possible to keep the secret of the notification information.

Examples of a method of drawing a user near the device include:

- directly talking to users in the specific group such as "parents, please come close to me";
- shooting swirls of air to users in the specific group and drawing only the users in the specific group near the device;
- emitting specific light (specific color, blinking pattern, or the like) representing the users in the specific group from the light emitting unit 18 such that the users realize the notification;
- showing the name of the specific group by display or projection such that the users realize the notification, or showing specific light (color, blinking pattern, or the like) indicating the users in the specific group by display or projection;
- outputting a sound effect (SE) or BGM corresponding to the specific group such that the users realize the notification;
- providing a special feedback (such as nodding or eye contact like a wink while looking at each other) through the light emitting unit 18, display, or projection when the user in the specific group is looking at the information processing device 1a such that the users realize the notification; and
- vibrating devices (such as smartphones and wearable terminals) held by the respective users in the specific group such that the users realize the notification.

Alternatively, the information processing device 1a may allow users in a direction of the specific group to hear voices by using a speaker array. Alternatively, the information processing device 1a talks to the users of the specific group that you've got notification information, and transfer its detailed contents to the devices held by the respective users in the specific group (such as smartphones, wearable terminals, TVs in their own rooms).

In addition, the right side of FIG. 9B illustrates a notification example of the Private person type. It is assumed that the Private person type includes notification to a specific user, the notification including secrecy, such as recommendation according to hobby/preference of the user (music, movie, book, event, or he like) or notification regarding contents of a business e-mail. In this case, as illustrated in FIG. 9B, the information processing device 1a issues the notification only to the specific user. Specifically, for example, the information processing device 1a draws the specific user near the information processing device 1a and tell her "the photo book of DD is released" (information on an item recommended in accordance with the hobby/preference of the individual) in a low voice, or outputs the voice to earphones connected in a wired/wireless manner (such as Blue tooth (registered trademark)). By drawing the notification target user near the information processing device 1a, it is possible to keep the secret of the notification information.

Examples of a method of drawing a user near the device include:

- directly talking to the specific user, such as "miss, please come close to me";
- shooting a swirl of air to the specific user and drawing only the specific users near the device;
- emitting specific light (specific color, blinking pattern, or the like) representing the specific user from the light emitting unit 18 such that the specific user realizes the notification;
- showing the name of the specific user by display or projection such that the specific user realizes the notification, or showing specific light (color, blinking pattern, or the like) indicating the specific user by display or projection;
- outputting a sound effect (SE) or BGM corresponding to the specific user such that the specific user realizes the notification;
- providing a special feedback (such as nodding or eye contact like a wink while looking at each other) through the light emitting unit 18, display, or projection only when the specific user is looking at the information processing device 1a such that the specific user realizes the notification; and
- vibrating devices (such as smartphones and wearable terminals) held by the specific user such that the specific user realizes the notification.

Alternatively, the information processing device 1a may allow a user in a direction of the specific user to hear voices by using a speaker array. Alternatively, the information processing device 1a may talk to the specific user that you've got notification information, and transfer its detailed contents to the device held by the specific user (such as smartphones, wearable terminals, TVs in their own rooms).

Note that, examples of other methods of issuing notification of the Private group type or the Private person type to a specific group or a specific user also include as follows:

in the case where the information processing device 1a is a self-propelled device, it is also possible for the information processing device 1a to approach the specific group or the specific user by itself to notify of the information. Alternatively, the information processing device 1a approaches the specific group or the specific user as possible as it can, and then draws the users near the information processing device 1a as described above;

the information processing device 1a issues notification when the specific group or the specific user approaches an installation position of the information processing device 1a.

Although another user can recognize the destination of the notification by using the above described method, the information processing device 1a can keep the anonymity of the notification (hide the destination of the notification information).

Specifically, for example, the information processing device 1a may confirm that there is no user other than the specific user in a notification range by using the camera 14 (such as RGB camera) or a sensing device such as the ranging sensor 15 or an infrared (IR) sensor, and then issue notification by voice, display, or projection. Although the case where there is only the specific user is desirable, it is possible to issue notification by voice, display, or projection even in the case where the other users are far enough away from the information processing device 1a. Such sensing devices do not have to be used in the case where the notification information is transmitted by voice to the earphones of the specific user that is connected in a wired/wireless manner, or in the case where the notification information is transferred to the device held by the specific user.

In addition, it is also possible for the information processing device 1a to recognize positions of the specific user (target user) and a user other than the specific user (non-target user) on the basis of GPS information of devices held by the respective users, or on the basis of daily habits of action of the respective users (for example, the user usually works outside the house on weekdays). For example, it is possible for the information processing device 1a to judge a notification timing by using information of the habits of action of the specific user.

In addition, in the case where it is impossible to keep anonymity, the notification method is switched to a method by which the anonymity can be kept such as direct output of voice through earphone connection or transfer of the notification to the device held by the specific user.

Alternatively, in the case where conversation (voice response) with the specific user is going on in advance, the information processing device 1a issues notification by using its context, which enables issuing notification so as not to let the other users to know the content of the notification even if there are the other users.

For example, in the case where a certain user has asked the information processing device 1a that "please let me know when the ABC doll comes in the stock as a Christmas present" in advance, the information processing device 1a notifies the specific user by voice "the item you asked me about before came in the stock". The other user (non-target user) does not know the past conversation and does not understand what this conversation means. Accordingly, secrecy of the notification information can be kept. Examples of such a notification method using context include:

using date such as "the matter you asked me yesterday is solved";

indicating only who is involved such as "the matter Ms. B asked me before is solved";

using a pronoun such as "I'm talking about that" or "I'm talking about it";

using a unique ID such as "I'm talking about A103" or "I'm talking about the task 13";

using a secret language such as "I'm talking about the pine" or "I'm talking about the book"; and displaying ciphers or speaking in ciphers such as "○□△#%".

Note that, the information processing device 1a may switch the talking methods in accordance with an importance level of the notification information. For example, in the case of notification information with a high importance level, the notification is issued by voice, light emission, projection, or the like. On the other hand, in the case of notification information with a low importance level, the notification is issued by using an appropriate method according to the notification type described above.

6. Conclusion

As described above, according to the embodiments of the present disclosure, it is possible to improve convenience of a speech recognition system by deciding an appropriate response output method in accordance with a current surrounding environment when the voice UI outputs a response.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing a hardware such as a CPU, a ROM, and a RAM, which are embedded in the above described information processing device 1, to execute the above-described functions of the information processing device 1. Moreover, it may be possible to provide a computer-readable recording medium having the computer program stored therein.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a response generation unit configured to generate a response to a speech from a user;

a decision unit configured to decide a response output method in accordance with a current surrounding environment; and an output control unit configured to perform control such that the generated response is output by using the decided response output method.

(2)

The information processing device according to (1), in which the decision unit decides response output using voice or response output using display.

(3)

The information processing device according to (2), in which the decision unit decides control of audio volume or directivity at a time of the response output using voice in accordance with the current surrounding environment.

(4)

The information processing device according to (2), in which the decision unit decides selection of a display device or adjustment of brightness at a time of the response output using display in accordance with the current surrounding environment.

(5)

The information processing device according to (4), in which the display device is selected from among a main display, a sub-display, and a cooperating external display device.

(6)

The information processing device according to any one of (2) to (5), further including a calculation unit configured to calculate an allowable output level on the basis of the current surrounding environment, in which the decision unit decides the response output method in accordance with the calculated allowable output level.

(7)

The information processing device according to (6), in which the current surrounding environment includes at least any of a time slot, existence of an external sound source, a user environment, appearance of a user, a position of a user, and a physical characteristic of a user.

(8)

The information processing device according to (6) or (7), in which the decision unit decides the response output method in accordance with whether the allowable output level exceeds a predetermined threshold.

(9)

The information processing device according to any one of (6) to (8), in which, in the case where the allowable output level changes as the surrounding environment changes during conversation, the decision unit changes the response output method in accordance with the allowable output level that has changed.

(10)

The information processing device according to any one of (6) to (9), in which the output control unit performs control such that a user is notified of the allowable output level.

(11)

A control method including:

generating a response to a speech from a user;

deciding a response output method in accordance with a current surrounding environment; and performing control, by an output control unit, such that the generated response is output by using the decided response output method.

(12)

A program causing a computer to function as:

a response generation unit configured to generate a response to a speech from a user;

a decision unit configured to decide a response output method in accordance with a current surrounding environment; and an output control unit configured to perform control such that the generated response is output by using the decided response output method.

REFERENCE SIGNS LIST 1 information processing device
3 communication terminal
10 control unit
10a speech recognition unit
10b semantic analysis unit
10c response generation unit
10d level calculation unit
10e decision unit
10f output control unit
11 communication unit
12 microphone
13 loudspeaker
14 camera
15 ranging sensor
16 projection unit
17 storage unit
18 light emitting unit
19 sub-display
20 wall
21a speech content image
21b response image
21c response related image
30a to 30e display example
31 to 33 icon

The invention claimed is:

1. An information processing device comprising:

a decision unit configured to decide a notification type of acquired notification information, the notification type indicating whether or not all users of a plurality of users can recognize the notification information; and an output control unit configured to perform control such that an output method and whether initial notification of the notification information is postponed are determined on the basis of a current surrounding user environment and the notification type of the notification information, and in a case where the initial notification is not postponed, the notification information is initially output by using the determined output method, wherein the decision unit decides whether the notification type of the notification information is Public all, Public person, Private group, or Private person, wherein the output control unit determines whether the initial notification is postponed in accordance with whether the notification type of the notification information is Public or Private and whether the current surrounding user environment is suitable for the notification type, wherein Private person indicates that only a specific user of the plurality of users can recognize the notification information, wherein the output control unit determines that the initial notification is postponed in accordance with the notification type of the notification information being Private person and the current surrounding user environment being not suitable for only the specific user being able to recognize the notification information, wherein, in a case the output control unit determines that the initial notification is postponed, the initial notification is added to a queue for the initial notification when the output control unit determines the initial notification is allowed, and wherein the decision unit and the output control unit are each implemented via at least one processor.

2. The information processing device according to claim 1, wherein the decision unit decides the notification type of the notification information on the basis of a notification content of the notification information.

3. The information processing device according to claim 1, wherein the decision unit decides the notification type of the notification information on the basis of a notification target of the notification information.

4. The information processing device according to claim 1, wherein the decision unit decides the notification type of the notification information on the basis of an application that is a source of the notification information.

5. The information processing device according to claim 1, wherein, in a case where the notification type is Private and the current surrounding user environment is an environment in which it is impossible to ensure secrecy, the output control unit performs specific output control such that the secrecy is ensured.

6. The information processing device according to claim 1, wherein, in the case where an external display device outputs information, the output control unit performs control such that a display provided on the information processing device outputs display indicating the external display device.

7. A control method to be used by a processor, the control method comprising:
deciding a notification type of acquired notification information, the notification type indicating whether or not all users of a plurality of users can recognize the notification information; and
performing control such that an output method and whether initial notification of the notification information is postponed are determined on the basis of a current surrounding user environment and the notification type of the notification information, and in a case where the initial notification is not postponed, the notification information is initially output by using the determined output method,
wherein the deciding of the notification type includes deciding whether the notification type of the notification information is Public all, Public person, Private group, or Private person,
wherein the determination of whether the initial notification is postponed is in accordance with whether the notification type of the notification information is Public or Private and whether the current surrounding user environment is suitable for the notification type,
wherein Private person indicates that only a specific user of the plurality of users can recognize the notification information,
wherein the initial notification is determined to be postponed in accordance with the notification type of the notification information being Private person and the current surrounding user environment being not suitable for only the specific user being able to recognize the notification information, and
wherein, in a case that the initial notification is determined to be postponed, the initial notification is added to a queue for the initial notification in a case that the initial notification is determined to be allowed.

8. A non-transitory computer-readable medium having embodied thereon a program, which when executed by a computer causes the computer to execute a method, the method comprising:
deciding a notification type of acquired notification information, the notification type indicating whether or not all users of a plurality of users can recognize the notification information; and
performing control such that an output method and whether initial notification of the notification information is postponed are determined on the basis of a current surrounding user environment and the notification type of the notification information, and in a case where the initial notification is not postponed, the notification information is initially output by using the determined output method,
wherein the deciding of the notification type includes deciding whether the notification type of the notification information is Public all, Public person, Private group, or Private person,
wherein the determination of whether the initial notification is postponed is in accordance with whether the notification type of the notification information is Public or Private and whether the current surrounding user environment is suitable for the notification type,
wherein Private person indicates that only a specific user of the plurality of users can recognize the notification information,
wherein the initial notification is determined to be postponed in accordance with the notification type of the notification information being Private person and the current surrounding user environment being not suitable for only the specific user being able to recognize the notification information, and
wherein, in a case that the initial notification is determined to be postponed, the initial notification is added to a queue for the initial notification in a case that the initial notification is determined to be allowed.

9. The information processing device according to claim 1, wherein Public all indicates that all users of the plurality of users can recognize the notification information,
wherein Public person indicates that only users in a specific group of the plurality of users can recognize the notification information, and
wherein Private person indicates that only a specific user of the plurality of users can recognize the notification information.

10. The information processing device according to claim 1, wherein Private person indicates that only a specific user of the plurality of users can recognize the notification information,
wherein, in the case where the notification type is Private person and the current surrounding user environment is an environment in which it is impossible to ensure secrecy, the output control unit performs specific output control such that the determined output method ensures that only the specific user can recognize the notification information, and
wherein, when the current surrounding user environment is an environment in which it is impossible to ensure secrecy, the notification information is initially output by using the determined output method so that only the specific user can recognize the notification information.

* * * * *